United States Patent [19]
Anderson

[11] 3,764,888
[45] Oct. 9, 1973

[54] DIRECT CURRENT TACHOMETER SYSTEM

[75] Inventor: Dennis R. Anderson, Warensville Hgts., Ohio

[73] Assignee: Avtron Manufacturing Inc., Cleveland, Ohio

[22] Filed: Aug. 24, 1972

[21] Appl. No.: 283,275

Related U.S. Application Data

[63] Continuation-in-part of Ser. No. 210,715, Dec. 22, 1971, abandoned.

[52] U.S. Cl.............. 322/20, 318/314, 318/318, 318/328, 322/24, 322/28, 322/31, 324/161
[51] Int. Cl. ............................................. H02p 9/00
[58] Field of Search ............... 322/20, 24, 28, 29, 322/31, 32, 91; 318/314, 318, 326, 327, 328, 341, 607, 608; 324/161, 163, 164, 166

[56] References Cited
UNITED STATES PATENTS

| | | | |
|---|---|---|---|
| 3,084,307 | 4/1963 | Landis | 324/161 X |
| 3,121,836 | 2/1964 | Rosenberry | 322/24 |
| 3,215,918 | 11/1965 | Lichowsky | 318/328 X |
| 3,218,538 | 11/1965 | Sear | 318/328 X |
| 3,581,561 | 6/1971 | Tomashek et al. | 324/161 UX |

Primary Examiner—J. D. Miller
Assistant Examiner—H. Huberfeld
Attorney—Robert B. Sundheim

[57] ABSTRACT

A direct current tachometer system provides a DC output signal having a magnitude which varies with the tachometer speed. Reference pulses are generated exhibiting a frequency proportional to tachometer speed. A control circuit serves to vary the magnitude of the DC output signal in dependence upon the frequency of the reference pulses.

22 Claims, 5 Drawing Figures

DIRECT CURRENT TACHOMETER SYSTEM

This is a continuation-in-part of my copending U.S. application Ser. No. 210,715, filed on Dec. 22, 1971, and now abandoned and assigned to the same assignee as this application.

This invention relates to the art of tachometer systems and, more particularly, to a tachometer generator having circuitry for providing a regulated DC output signal.

The invention is particularly applicable for use in motor control applications; however, it is not limited to same, and may be used in various applications requiring precisely regulated DC output signals.

Direct current tachometers for directly generating direct current speed signals are well known. A major disadvantage in using such generators, however, is that substantial brush maintenance is required during the generator's operating lifetime. For this reason, various proposals have been made to provide brushless tachometers, such as an AC generator together with suitable rectifying circuitry to provide a DC output signal. Such a DC output signal, however, is a rough and unregulated signal which is only approximately proportional to shaft speed. Other proposals have included utilizing a toothed gear wheel mounted on a rotating shaft together with a transducer which counts the teeth as they pass so that impulses are counted during each cycle of rotation of the rotating shaft. With a fixed number of impulses being associated with each revolution, the pulse frequency may be translated into a DC signal representative of shaft speed. However, the accureacy of such systems is inherently limited by the number of teeth which may be provided on such a gear wheel, the difficulties in obtaining exact symmetry in gear profile, and the substantial slow response time to changing shaft speed, particularly at low speeds.

The present invention is directed to an improved tachometer generator system employing a novel control circuitry for purposes of obviating the foregoing disadvantages and others of such previous tachometer systems.

The present invention contemplates the provision of a direct current tachometer system for providing a DC output signal having a magnitude which varies with tachometer speed.

In accordance with one aspect of the present invention, circuitry is provided for purposes of providing reference pulses exhibiting a frequency proportional to tachometer speed. Further control circuitry serves to vary the magnitude of the DC output signal in dependence upon the frequency of the reference pulses.

In accordance with a more limited aspect of the present invention, the control circuitry includes active electronic circuits connected to receive DC operating or bias potentials and a power supply circuit serves to provide the DC operating or bias potentials to all of the active electronic circuits from the DC output signal obtained from the tachometer generator.

In accordance with a still further aspect of the present invention, the control circuitry includes frequency to voltage conversion means for developing a control signal having a magnitude proportional to the frequency of the reference pulses for use in varying the magnitude of the DC output signal.

In accordance with a still further aspect of the present invention, signal pulses are provided exhibiting a frequency proportional to the magnitude of the DC output signal, and the control circuitry serves to vary the magnitude of the DC output signal in dependence upon the frequency of the reference pulses and the signal pulses.

In accordance with another aspect of the present invention, the control circuitry includes voltage to frequency conversion circuitry to convert the DC output signal into a train of signal pulses which exhibits a frequency directly related to the magnitude of the DC output signal.

In accordance with a still further aspect of the present invention, a pulse generator is provided for monitoring the input shaft of the tachometer generator for purposes of providing a fixed number of reference pulses during each cycle of rotation of the shaft so as to thereby provide reference pulses which exhibit a frequency proportional to the tachometer speed.

In accordance with a still further aspect of the present invention, the control circuitry employs a phase-lock servo loop control circuit which serves to continuously adjust the magnitude of the generated DC output signal toward that which would result in the reference pulses and the signal pulses being synchronously related in phase and frequency.

Still further in accordance with the present invention, the phase-lock servo loop control circuit employs a phase comparator for purposes of providing an output control signal dependent upon any phase displacement between the reference pulses.

Still further in accordance with the present invention, the servo loop control circuit employs integrating circuitry for purposes of integrating the output control signal and providing therefrom an error signal which is applied to a regulating circuit for purposes of varying the magnitude of the DC output signal in dependence upon the error signal.

The primary object of the present invention is to provide an improved direct current tachometer system which exhibits improved reliability with low maintenance requirements.

A still further object of the present invention is to provide an improved direct current tachometer system which employs solid state control circuitry for obtaining improved performance with economical operation.

A still further object of the present invention is to provide a tachometer generator system having control circuitry which obtains operating or bias potentials from the tachometer generator thereby obviating the need for a separate power source.

The foregoing and other objects and advantages of the invention will become more readily apparent from the following description of the preferred embodiment of the invention, taken in conjunction with the accompanying drawings which are a part hereof and wherein.

Figure 1:
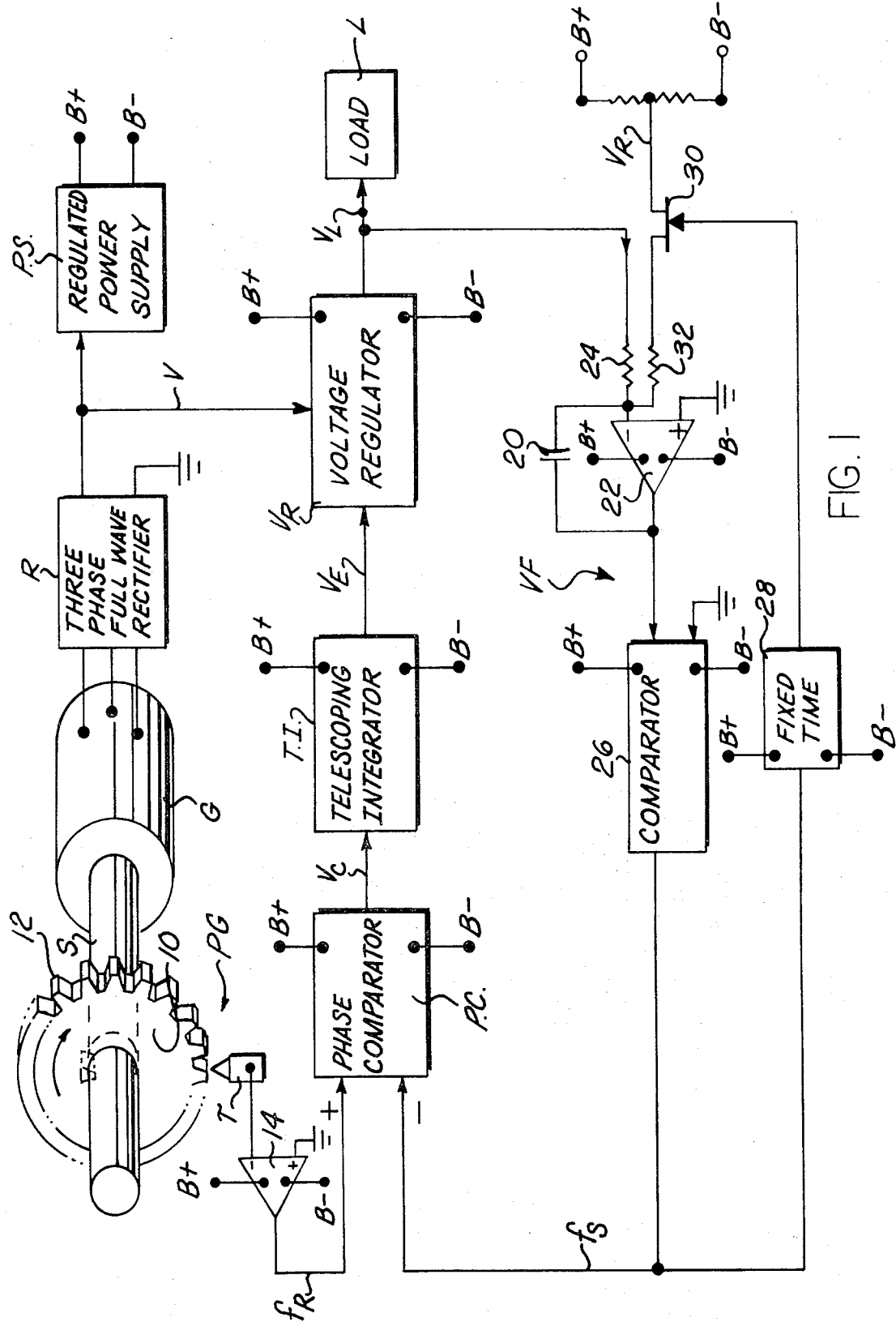
FIG. 1 is a schematic-block diagram illustration of the preferred embodiment of the invention.
Figure 2:
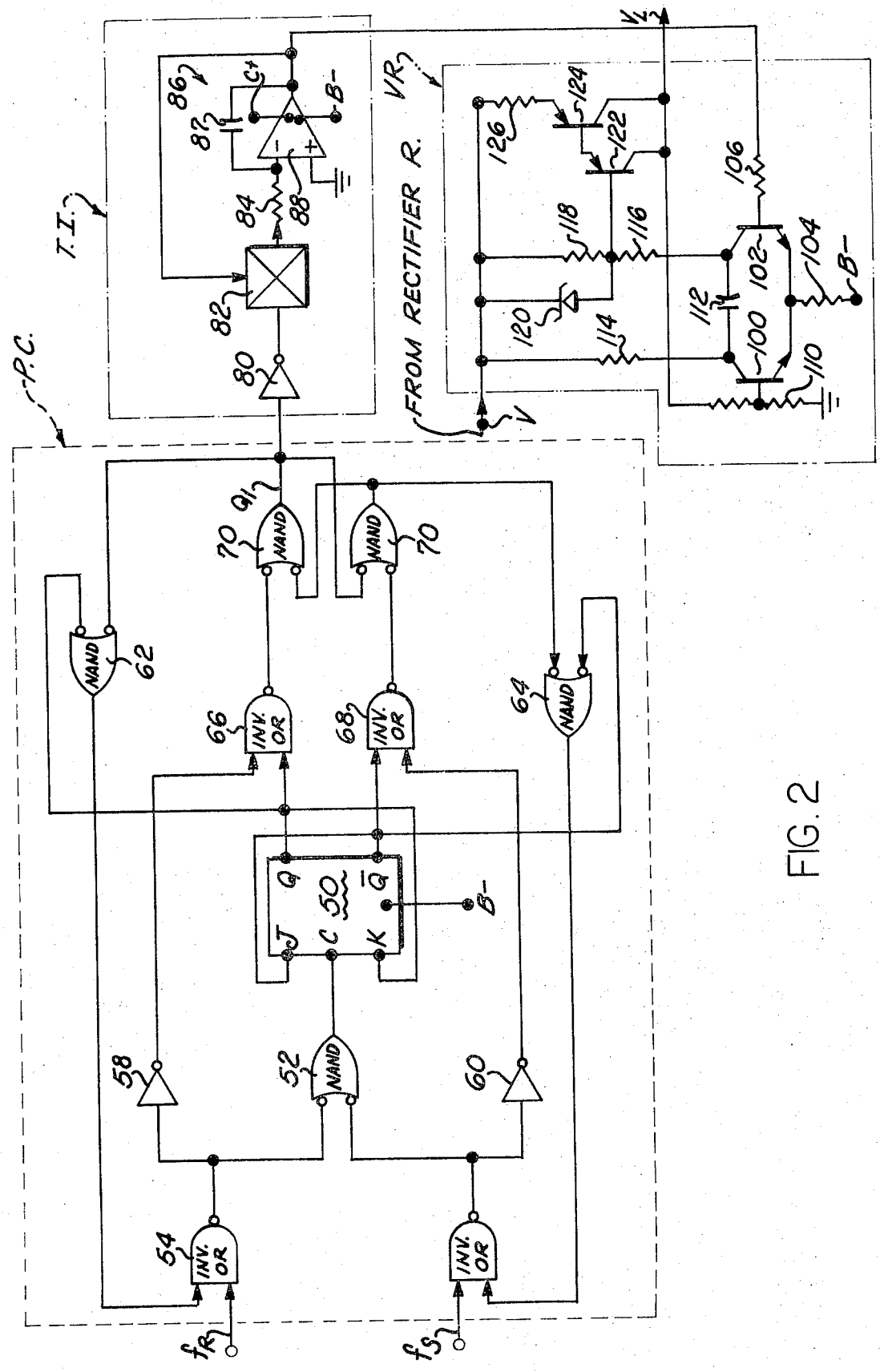
FIG. 2 is a schematic illustration of a portion of the circuitry employed in FIG. 1.

Referring now to the drawings wherein the showings are for purposes of illustrating preferred embodiments of the invention only and not for purposes of limiting the same, FIGS. 1 and 2 illustrate one embodiment of a tachometer system constructed under the present invention and which includes a brushless permanent magnet AC generator G having an input shaft S and a three-phase output circuit connected to a conventional three-phase full-wave rectifier circuit R, which provides a DC output voltage V having a magnitude dependent upon the angular velocity of shaft S. Whereas generator G is shown as having a three-phase output circuit, it is to be appreciated that a single or two-phase output circuit may be employed in accordance with the invention. The DC output voltage V is applied to a suitable load L which may take various forms, such as a meter for providing a visual indication as to the angular velocity of shaft S. The load may also be a motor control circuit which, in accordance with the magnitude of voltage V, serves to control a motor to vary the rotational velocity of the motor's output shaft which, in turn, is coupled to shaft S of generator G. The full-wave rectified DC output voltage V is a relatively rough and unregulated DC voltage which is only approximately proportional to the angular velocity of shaft S. The output voltage V, taken from the full-wave rectifier R, is applied to a voltage regulator VR to obtain a regulated voltage $V_L$ which is supplied to load L. The output voltage $V_L$ is obtained by regulating voltage V in dependence upon an error signal voltage $V_E$ obtained from control circuitry to be described in greater detail hereinafter.

The output voltage $V_L$ is applied to a voltage-to-frequency converter VF which provides signal pulses $F_S$ exhibiting a frequency proportional to the magnitude of voltage $V_L$. Signal pulses $F_S$ are applied to one input of a phase comparator circuit PC. A pulse generator PG is provided for providing reference pulses $F_R$ exhibiting a frequency dependent on the angular velocity of shaft S and these reference pulses are applied to the second input of the phase comparator PC. The phase comparator provides an output control signal $V_C$ in dependence upon the phase-frequency relationship between signal pulses $F_S$ and reference pulses $F_R$. The control signal $V_C$ is integrated by a telescoping integrator circuit TI, having a variable time constant, to provide the error signal $V_E$. The error signal is applied to the voltage regulator VR to vary the magnitude of the direct current output voltage $V_L$ in dependence upon the phase-frequency comparison. Thus, a phase-lock servo loop control is provided in that the output voltage $V_L$ is varied to thereby cause the frequency of the signal pulses $F_S$ to be varied toward that of the reference pulses $F_R$. In this manner, the output voltage $V_L$ is precisely regulated in dependence upon the angular velocity of shaft S.

Having briefly described the operation of the tachometer generator system, attention is now directed toward the construction features. The pulse generator PG may take various forms. However, in the preferred embodiment of the invention, it includes a gear wheel 10 mounted to shaft S for rotation therewith. Gear wheel 10 is provided with radially extending gear teeth 12 of equal size and spacing. For example, wheel 10 may have 320 teeth to provide 320 pulses for each revolution of shaft S. The pulse generator also includes a transducer T, of the reluctance type, for purposes of providing one pulse for each tooth passing in close proximity to the transducer. The pulses are amplified by a suitable amplifier 14 and applied as the reference pulses $F_R$, as positive or binary 1 signal level pulses, to one input of the phase comparator PC.

Whereas the voltage-to-frequency converter VF may take various forms of analog-to-frequency converters, it preferably includes an integrator circuit having an energy storage means in the form of a capacitor 20 connected between the inverting input and the output circuit of a conventional operational amplifier 22. The analog input signal, in this case, is the output DC signal $V_L$ which is applied through a resistor 24 to the inverting input or summing point of the operational amplifier. Consequently, the capacitor 20 charges at a rate dependent on the magnitude of voltage signal $V_L$. The output signal of the operational amplifier is applied to one input of a conventional comparator 26 which serves to compare the integrated output signal from the operational amplifier with a reference, such as ground potential, and when the amplifier's output signal attains a level equal to ground potential, the comparator provides an output signal pulse. This output signal pulse is, in turn, applied to a fixed time circuit 28, which may take any suitable form, such as a one-shot monostable oscillator, for purposes of providing an output signal of a fixed time duration for each signal pulse received from the comparator 26. The output signal taken from the fixed time circuit 28 is used to actuate a suitable switch, such as field effect transistor 30, for the fixed time duration for purposes of discharging capacitor 20. Thus, when the field effect transistor 30 is actuated into conduction, it connects a reference voltage $V_R$, of opposite polarity from output voltage $V_L$, through a resistor 32 so that the capacitor 20 discharges for the fixed period of time. Thereafter, the capacitor is then charged at a rate dependent upon the magnitude of the DC output signal $V_L$ as the cycle repeats itself. The output signal pulses $F_S$ obtained from comparator 20 exhibit a frequency which is proportional to the magnitude of the output signal $V_L$. These pulses are applied as positive or binary 1 signal pulses to the second input of the phase comparator PC for comparison with the signal pulses $F_R$.

PHASE COMPARATOR

The phase comparator PC is illustrated in FIG. 2 and serves to compare the reference pulses $F_R$ with the signal pulses $F_S$. Any phase or frequency difference is sensed by the comparator and an output control signal $V_C$ is applied to the telescoping integrator TI to control the magnitude of the direct current output signal. The phase comparator PC includes a two bit up/down binary counter including a JK flip-flop 50 which is triggered by positive or binary 1 signal pulses. In a conventional fashion, the JK flip-flop 50 includes two input terminals J and K, together with two output terminals Q and $\overline{Q}$, together with a trigger input terminal C. The trigger input terminal C is connected to the output circuit of a conventional NAND gate 52 having one of its input circuits connected to the output circuit of a conventional inverted OR gate 54 and the second input circuit being connected to the output circuit of another inverted OR gate 56. As will be apparent from the description herein, the inverted OR gates and the NAND gates function in identical manner. The inverted OR gates 54 and 56 serve to respectively receive reference pulses $F_R$ and signal pulses $F_S$. The output circuits of inverter OR gates 54 and 56 are also respectively applied to one input circuit each of inverter amplifiers 58 and 60. The second input circuits of the inverted OR gates 54 and 56 are respectively connected to the output circuits of NAND gates 62 and 64. NAND gate 62 has one input circuit taken from output terminal Q of flip-flop 50, whereas NAND gate 64 has one input circuit taken from output terminal $\overline{Q}$ of flip-flop 50. The output terminals Q and $\overline{Q}$ of flip-flop 50 are respectively connected to input terminals K and J, as well as being respectively connected to one input circuit each of inverted OR gates 66 and 68. The output circuits of inverted OR gates 66 and 68 are respectively connected to one input circuit each of NAND gates 70 and 72. These two NAND gates are connected together to define a bistable multivibrator circuit with the output circuit of NAND gate 70 serving as the output circuit of the phase comparator PC and is labeled as output terminal $Q_1$. In addition, the output circuits of NAND gates 70 and 72 are respectively connected to one input each of NAND gates 62 and 64.

As will be described hereinafter in the detailed description of operation, output terminal $Q_1$ of the phase comparator circuit PC will carry a control signal $V_C$ in the form of either a binary 1 or a binary 0 signal, dependent on the phase-frequency relationship of the signal pulses $F_S$ and the reference pulses $F_R$. The control signal $V_C$ is applied to the telescoping integrator TI.

TELESCOPING INTEGRATOR

The telescoping integrator TI serves to receive the control signal $V_C$ in the form of either a binary 1 or a binary 0 signal and provides an integrated error signal $V_E$ for application to the voltage regulator VR. Whenever the output control signal $V_C$ to the telescoping integrator TI is a binary 1 signal, the integrated output error signal $v_E$ will be a positive going signal which serves, when applied to voltage regulator VR, to increase the magnitude of the DC output signal $V_L$. This condition is indicative that the frequency of signal pulses $F_S$ is less than that of the reference pulses $F_R$. As the DC output voltage $V_L$ increases in magnitude, the voltage-to-frequency converter VF increases the frequency of signal pulses $F_S$ toward that of the frequency of reference pulses $F_R$. Conversely, if the input control signal $V_C$ applied to the telescoping integrator TI is a binary 0 signal, then the error signal $V_E$ will be a negative-going signal, causing the output signal $V_L$ to decrease in magnitude and causing the frequency of signal pulses $F_S$ to decrease toward that of the reference pulses $F_R$.

The telescoping integrator TI, as shown in FIG. 2, includes an inverter amplifier 80 for receiving the binary 1 or binary 0 control signal $V_C$. This inverter, however, serves to invert a positive or binary 1 signal into a negative level signal and to invert a binary 0 control signal into a positive signal. The output of inverter amplifier 80 is applied through a multipying circuit 82 and thence through a resistor 84 to the summing point of an integrating circuit 86. The integrating circuit 86 includes a conventional operational amplifier 88 and an integrating capacitor 87 connected between the summing point or inverting input of the amplifier and the output circuit of the amplifier. The output circuit of the amplifier is, in turn, connected to the multipying circuit 82 so that the output signal from amplifier 80 is multiplied by the integrator's output signal. This multiplier function serves to provide a telescoping or varying time constant for the integrating circuit. This feature will be described in greater detail in the description of operation which follows hereinafter.

VOLTAGE REGULATOR

The error signal $V_E$ taken from the output circuit of the telescoping integrator TI is applied to the voltage regulator VR. The voltage regulator, as best shown in FIG. 2, is a series-pass-transistor regulator with current limiting features. Thus, the circuitry employs a pair of NPN transistors 100 and 102 having their emitters connected in common and then through a resistor 104 to a B- voltage supply source. The base of the transistor 102 is connected through a resistor 106 to the output circuit of the telescoping integrator TI. The base of transistor 100 is connected to the midpoint of a voltage divider including series-connected resistors 108 and 110 with the opposite end of resistor 108 serving as the output of the regulator to provide the regulated DC output signal $V_L$. The collectors of transistors 100 and 102 are connected together through a capacitor 112. In addition, the collector of transistor 110 is connected through a resistor 114 to the input circuit of the voltage regulator which, in turn, is connected to the output circuit of the three-phase full-wave rectifier R. The collector of transistor 102 is connected through a pair of series-connected resistors 116 and 118 to the input circuit and a Zener diode 120, poled as shown, is connected across a resistor 118. The junction of resistors 116 and 118 is connected to the base of a PNP transistor 122 having its collector connected to the output circuit of the voltage regulator. The emitter of transistor 122 is connected to the base of another NPN transistor 124 having its collector connected to the output circuit of the voltage regulator and its emitter connected through a resistor 126 to the input circuit of regulator VR.

If the output error signal $V_E$ from the telescloping integrator increases in a positive direction, then transistor 102 in the voltage regulator will become more positively biased so that the potential at its collector and hence at the base of transistor 122 becomes more negative. This, in turn, will increase the conductivity of transistors 122 and 126 so that the voltage developed across resistors 108 and 110 will increase in level to thereby increase the magnitude of the DC output signal $V_L$. Conversely, if the error signal $V_E$ becomes more negative, then the opposite operation will result, whereupon the magnitude of the output voltage $V_L$ will decrease in magnitude.

OPERATION

During the operation of the tachometer system, reference pulses $F_R$ are generated by the pulse generator PG at a frequency directly related to the angular velocity of shaft S. Also, the voltage to frequency converter VF provides signal pulses $F_S$ at a frequency proportional to the magnitude of the direct current output signal $V_L$. For purposes of description herein, each frequency pulse will be considered as a binary 1 signal, whereas the absence of a frequency pulse will be considered as a binary 0 signal. The signal pulses $F_S$ and the reference pulses $F_R$ are compared by the phase comparator PC.

The phase comparator PC has two terminals of particular interest for the following description of operation; to wit, output terminal Q1 and terminal Q of flip-flop 50. The binary states at terminals Q1, Q include four binary levels; to wit, 00, 01, 10 and 11. The four binary levels are dependent upon the phase-frequency of the reference pulses $F_R$ is greater than that of the signal pulses $F_S$, then the binary state at terminals Q1, Q oscillates from 1,0 to 1,1 to 1,0, etc. Each time terminal Q1 is at a binary 1 signal level, the signal is inverted by amplifier 80 so that a negative potential is applied to integrator 86. The output signal taken from the integrator will vary in an opposite direction and, consequently, a more positive going error signal $V_E$ is applied to the voltage regulator VR. As discussed previously herein, when the error signal $V_E$ becomes more positive, the direct current output signal $V_L$ increases in magnitude. An increase in magnitude of the DC output signal $V_L$, in turn, causes the frequency of the signal pulses $F_S$ to increase toward that of the reference pulses $F_R$. If, on the other hand, the frequency of the signal pulses $F_S$ is greater than that of the reference pulses $F_R$, then the binary states at terminals Q1, Q will oscillate between the binary signal levels 0,0 to 0,1 to 0,0, etc. Each time the output terminal Q1 is at a binary 0 level, the integrator output error signal $V_E$ will become more negative, causing voltage regulator VR to decrease the magnitude of the direct current output signal $V_L$. If the frequencies of signal pulses $F_S$ and reference pulses $F_R$ are synchronized, then the binary states at terminals Q1, Q will oscillate between binary signal levels 01, to 1,0 to 0,1, etc. Consequently, an average binary weight will exist between binary signals levels 0,1 and 1,0 at terminals Q1 and Q. If the average weight is binary signal level 0,1 then this is indicative that the reference pulses $F_R$ lag the signal pulses $F_S$ by 3.14 radians. Conversely, if the average weight obtained is a binary signal level of 1,0, then this is indicative that the reference pulses $F_R$ lead the signal pulses $F_S$ by 3.14 radians.

Reference is now made to TABLE I:

TABLE I

| Condition No. | Pulse Status | | $T_N$ | | $T_{N+1}$ | | Integrator Output |
|---|---|---|---|---|---|---|---|
| | $F_R$ | $F_S$ | Q1 | Q | Q1 | Q | |
| 1 | 0 | 0 | 0 | 0 | 0 | 0 | − |
| 2 | 1 | 0 | 0 | 0 | 0 | 1 | − |
| 3 | 1 | 0 | 0 | 1 | 1 | 0 | + |
| 4 | 1 | 0 | 1 | 0 | 1 | 1 | + |
| 5 | 1 | 0 | 1 | 1 | 1 | 1 | + |
| 6 | 0 | 1 | 1 | 1 | 1 | 0 | + |
| 7 | 0 | 1 | 1 | 0 | 0 | 1 | − |
| 8 | 0 | 1 | 0 | 1 | 0 | 0 | − |
| 9 | 0 | 1 | 0 | 0 | 0 | 0 | − |

The above table is in the form of a truth table showing, in part, the operation of the phase comparator PC for various conditions 1 through 9 of the reference and signal pulses $F_R$ and $F_S$. The pulse status of the input pulses is given together with the corresponding binary status at terminals Q1 and Q. The binary states at these terminals are indicated twice, with the first indication being at time $T_N$ which is just prior to receipt of pulses and then at time $T_{N+1}$ which is the binary state after receipt of the pulses. In addition, TABLE I indicates for each condition 1 through 9 the status of the integrator output signal $V_E$ as to whether the signal becomes more negative or more positive in dependence upon the binary states listed under the column $T_{N+1}$.

The initial condition 1 in TABLE I indicates a binary 0 signal level for the pulses, as well as terminals Q1 and Q. In condition 2, it is assumed that frequency pulse $F_R$ is present, but no signal pulse $F_S$ is present. In response to this condition the binary state at terminals Q1 and Q will become a signal level of 0,1. Consequently, the integrator's output circuit carries a negative going signal to cause the magnitude of the DC output voltage $V_L$ to decrease. Reference may be made to TABLE I for the binary states at terminals Q1, Q and the integrator output signal for the conditions 3 through 9.

The output control signal $V_C$ of the phase comparator PC is an alternating voltage having a DC component with the frequency of the alternating voltage being equal to that of the reference pulses $F_R$. Integrator circuit 86 removes the AC component and, as previously described herein, provides an error signal $V_E$ which is either a negative-going or positive-going signal for purposes of regulating the magnitude of the DC output voltage $V_L$. Multiplier 82 is inserted ahead of the integrator in order to provide a telescoping integrator time constant. Thus, the output voltage of the integrator is roughly proportional to the frequency of the phase comparator. However, by multiplying the integrator output signal with the comparator output signal, the integrator input voltage is accordingly adjusted. Consequently, for fast or high frequencies, the integrator output voltage will be high, since the multiplication of the integrator output voltage with the comparator output voltage generates a large voltage for application to the integrating circuit and thereby effectively creating a fast integration time constant. On the other hand, for slow or low frequency output conditions of the comparator, the integrator output voltage is at a low level, since the multiplication of the integrator output voltage with the comparator output voltage generates a low voltage input to the integrator to effectively lengthen the integrator time constant and thereby remove the low frequency AC components. Consequently, this technique of incorporating a multiplier ahead of the integrator circuit increases the dynamic range by a minimum of one order of magnitude. The telescoping integrator TI continuously applies the error signal $V_E$ to the voltage regulator throughout the operation of the tachometer system so as to continuously regulate the direct current output signal $V_L$ so that its magnitude is accurately representative of the tachometer speed.

Figure 3:
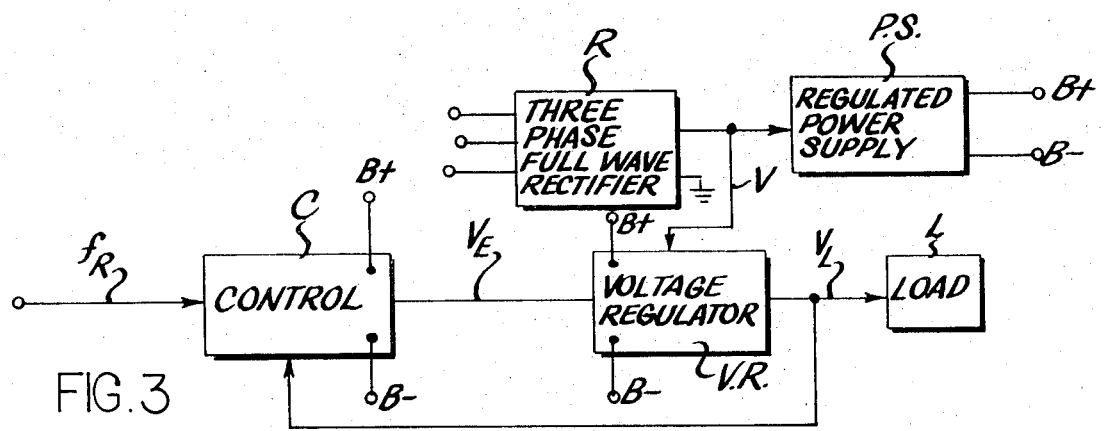
FIG. 3 is a block diagram illustrating of the embodiment in FIGS. 1 and 2.

Reference is now made to the illustration in FIG. 3 which presents, in block diagram form, a simplified illustration of the embodiment described thus far with reference to FIGS. 1 and 2. More specifically, the control circuit C, shown in FIG. 3, incorporates the phase comparator PC, the telescoping integrator TI and the voltage to frequency converter VF of FIG. 1. Briefly, the embodiment of FIGS. 1 and 2 as summarized in the simplified illustration in FIG. 3, includes a direct current tachometer system having circuitry, such as a three phase, full wave rectifier R, for providing a DC output signal V which has a magnitude that varies with tachometer speed. Reference pulses are provided, as with the pulse generator of FIG. 1, which exhibit a frequency proportional to the tachometer speed. The magnitude of the DC output signal is varied in dependence upon the frequency $F_R$ of the reference pulses. Control circuit C functions as a frequency to voltage converter since it provides a voltage signal $V_E$ to the voltage regulator $V_R$ from the reference frequency pulses $F_R$. Another aspect of this circuit, is the provision of the regulated power supply circuit PS. This circuit serves to provide the necessary B+ and B− operating potentials or bias voltages for the several active electronic circuits employed in the system. Thus, the circuit is self-powered in that no external batteries or the like are required. Instead, the output potential V taken from rectifier R is supplied to the regulated power supply PS which, in turn, provides regulated B+ and B− bias potentials.

ALTERNATIVE EMBODIMENTS

Figure 4:
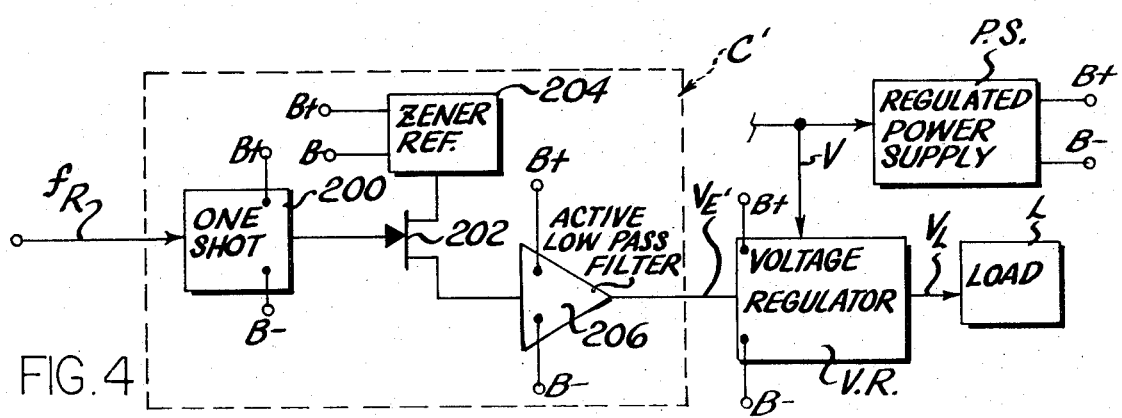
FIG. 4 is a schematic block diagram illustration of another embodiment of the invention; and, FIG. 5 is a schematic block diagram illustration of a still further embodiment of the invention.

Reference is now made to the embodiment of the invention illustrated in FIG. 4. This embodiment of quite similar to that illustrated and described hereinbefore with reference to FIGS. 1, 2 and 3, and like components are identified in all Figures with like character references. The embodiment of FIG. 4, like the embodiment described hereinbefore, employs a voltage regulator VR which applies a DC output signal $V_L$ to a load L. A control circuit C', like the control circuit C of FIG. 3, serves to receive the reference frequency pulses $F_R$, which exhibit a frequency proportional to the tachometer speed, and develop in dependence upon the frequency a control signal $V_E$. The control signal $V_E$ is applied to the voltage regulator VR to vary the magnitude of the DC output signal $V_L$ in dependence upon the frequency of the reference pulses $F_R$. The control circuit C' of FIG. 4, however, differs from the previously described control circuit in that it employs a one shot multivibrator circuit 200 which serves to provide a trigger pulse of a fixed duration for each received frequency pulse $F_R$. Each trigger pulse is used to trigger a field effect transistor 202 into conduction for a time duration corresponding to that of the trigger pulse. Each time the field effect transistor 202 is gated into conduction, it passes a signal of a fixed magnitude, as taken from a Zener reference 204, to the input circuit of a conventional active low pass filter 206. Consequently, the input signals to the active low pass filter take the form of a train of pulses at frequency $F_R$, with each pulse having a fixed time duration as determined by the one shot multivibrator circuit 200 and with each pulse having a fixed magnitude for that time duration as determined by the Zener reference 204. The output signal $V_E'$ taken from the output of the active low pass filter 206 will be a DC potential having a magnitude which varies in direct proportion to frequency $F_R$. Signal $V_E'$ is applied to the voltage regulator VR so as to vary the magnitude of the DC output signal $V_L$ in dependence upon frequency $F_R$ in the same manner as described hereinbefore with reference to the schematic circuit illustration of the voltage regulator in FIG. 2.

Figure 5:
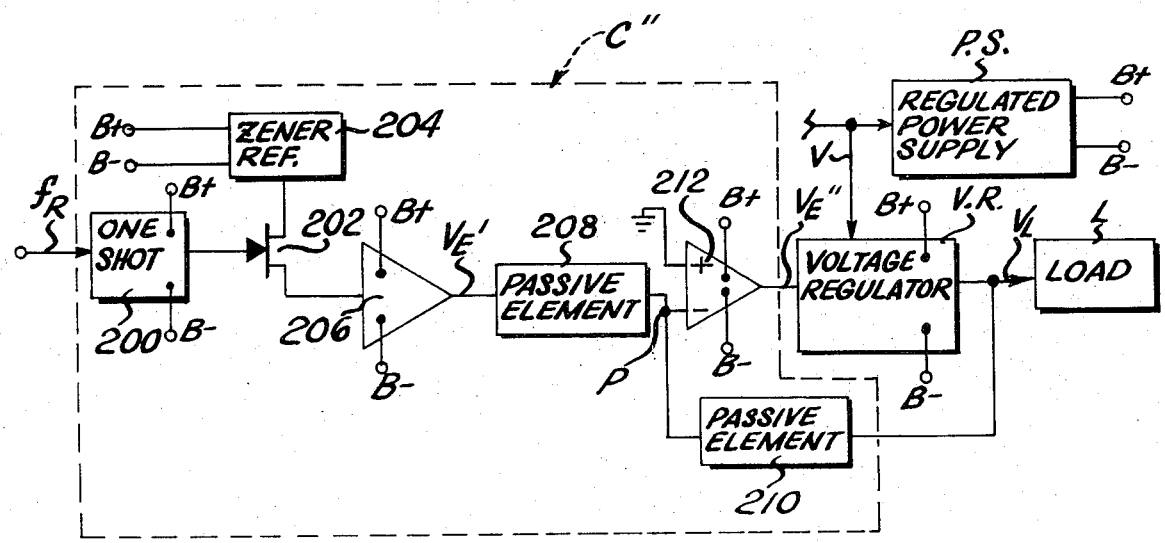

Reference is now made to the embodiment of FIG. 5, which is quite similar to that illustrated and described hereinbefore with respect to the embodiment of FIG. 4. Like components in both Figures are identified with like character references to simplify the description of the invention herein. The embodiment of FIG. 5 differs from the embodiment of FIG. 4 in that the control circuit C'' employs refinements to the active low pass filter to obtain improved accuracy whereby the output voltage $V_L$ will follow the control voltage $V_E''$ but will not be limited in its range of values. Specifically, the control circuit C'' is similar to that of control circuit C' in that it employs a one shot multivibrator circuit 200, a field effect transistor 202, a Zener reference source 204, and an active low pass filter 206. Additional filtering is provided by passive elements 208 and 210. These passive elements may each take the form of, for example, a T-filter network. The passive elements 208 and 210 are connected in common to a current summing point P leading to the inverting input of an operational amplifier 212. It is the output of the operational amplifier that provides the control signal $V_E''$ which is applied to the voltage regulator VR in the same sense as control signal $V_E'$ is applied to the voltage regulator in the embodiment of FIG. 4. However, the passive element 210 is connected in a negative feedback path from the output of the voltage regulator to the summing point P. Output voltage $V_E'$ is converted by the passive element 208 to a current which is applied to the summing point P. In addition, output voltage $V_L$ taken from the voltage regulator VR is converted by passive element 210 into a proportional current and applied to the summing point P. Here the currents along with amplifier errors cancel so that the output voltage $V_L$ will be more precisely representative of tachometer speed.

Although the invention has been described in conjunction with an alternating current tachometer generator G and a three phase, full wave rectifier R to obtain brushless tachometer operation, the invention is not limited to same. Thus, if desired, the tachometer generator may take the form of a conventional DC tachometer generator employing brushes and commutators to provide an unregulated DC signal, such as potential V, which varies in magnitude with tachometer speed. The unregulated signal may then be varied in dependence upon frequency pulses provided by the pulse generator PG in the manner described herein. Also, whereas the voltage regulator VR is illustrated herein as being a series regulator it is contemplated that the regulator may also take the form of a shunt regulator.

Whereas the invention has been described with reference to certain embodiments, it is to be appreciated that it is not limited to same as various modifications in addition to those described above may be made without departing from the spirit and scope of the invention as defined in the appended claims.

What is claimed is:

1. In a direct current tachometer system having an alternating current tachometer generator and rectifying means for providing a DC output signal having a magnitude which varies with tachometer speed and comprising:
    means for providing signal pulses exhibiting a frequency proportional to the magnitude of said DC output signal;
    means for providing reference pulses exhibiting a frequency proportional to said tachometer speed; and
    control means for varying the magnitude of said DC output signal in dependence upon the frequency relationship of said reference pulses and said signal pulses.

2. In a direct current tachometer system as set forth in claim 1, wherein said control means includes phase comparator circuit means responsive to said reference and signal pulses for providing an output signal in respective dependence upon the phase relationship between said pulses.

3. In a direct current tachometer system as set forth in claim 1, wherein said control means includes pulse comparing means for comparing said signal pulses and said reference pulses and providing a control signal indicative that said pulses are not in synchronism with each other; and
    output signal regulating means for varying the magnitude of said DC output signal in dependence upon said control signal.

4. In a direct current tachometer system as set forth in claim 3, including circuit means for applying said varied DC output signal to said signal pulse providing means for varying the frequency of said signal pulses.

5. In a direct current tachometer system as set forth in claim 4, including integrating circuit means interposed between said pulse comparing means and said output signal regulating means for integrating said control signal and applying the integrated output thereof as an error signal to said output signal regulating means which serves to vary said DC output signal in accordance with said error signal.

6. In a direct current tachometer system as set forth in claim 5, including signal multiplying means for multiplying said control signal by said error signal and applying the multiplied signal to the input of said integrating circuit means to effectively vary the integrating time constant of said integrator circuit means.

7. In a direct current tachometer system as set forth in claim 1, wherein said tachometer generator is a brushless permanent magnet generator having a rotatable shaft adapted to be connected to a rotatable member for providing an AC output signal proportional to the rotational speed of said rotatable member and said reference pulse providing means includes transducer means for providing a fixed number of said reference pulses for each revolution of said rotatable shaft and exhibiting a frequency dependent upon the angular velocity of said rotatable shaft.

8. In a direct current tachometer system as set forth in claim 7, including a gear wheel mounted on said shaft and having a plurality of gear teeth extending radially outward from the axis of rotation of said shaft with said gear teeth being of substantially uniform size and spaced from each other by a substantially uniform distance, said transducer means being located in close proximity to said gear wheel for providing a said output pulse for each gear tooth as said gear wheel completes one revolution.

9. In a direct current tachometer system as set forth in claim 8, wherein said transducer means includes a reluctance pulse transducer.

10. In a direct current tachometer system as set forth in claim 1, wherein said control means includes a phase locked servo loop control means for continuously adjusting the magnitude of said DC output signal toward that which would result in phase and frequency synchronously related reference pulses and signal pulses.

11. In a direct current tachometer system as set forth in claim 10, wherein said servo loop control means includes phase comparator means for providing an output control signal dependent on the phase displacement of said reference pulses and signal pulses.

12. In a direct current tachometer system as set forth in claim 11, wherein said servo loop control means includes integrating circuit means for integrating said output control signal and providing therefrom an error signal and DC output signal regulating means for varying the magnitude of said DC output signal in dependence upon said error signal.

13. In a direct current tachometer system as set forth in claim 11, wherein said phase comparator means includes a two bit binary signal reversible counter circuit means having input circuits for receiving said signal pulses and reference pulses as binary signal pulse and an output circuit for carrying a binary signal.

14. In a direct current tachometer system having tachometer generator means for providing a DC output signal having a magnitude which varies with tachometer speed and comprising:
means for providing reference pulses exhibiting a frequency proportional to said tachometer speed; and
control means for varying the magnitude of said DC output signal in dependence upon the frequency of said reference pulses.

15. In a direct current tachometer system as set forth in claim 14 wherein said control means includes active electronic means each connected to receive a DC bias potential, and power supply means for providing said DC bias potential for all of said active electronic means from said DC output signal provided by said tachometer generator means.

16. In a direct current tachometer system as set forth in claim 14 including means for providing signal pulses exhibiting a frequency proportional to the magnitude of said DC output signal and wherein said control means includes circuit means for varying the magnitude of said DC output signal in dependence upon the frequency relationship of said reference pulses and said signal pulses.

17. In a direct current tachometer system as set forth in claim 14, including voltage regulator circuit means for receiving said DC output signal and having circuit means for providing a regulated said DC output signal in dependence upon the magnitudes of said DC output signal and said control signal.

18. In a direct current tachometer system as set forth in claim 17, wherein said control means and said voltage regulator circuit means include active electronic circuit means for receiving bias potentials, and power supply means for receiving said DC output signal and providing bias potentials therefrom, and means for applying said bias potentials to said active electronic circuit means.

19. In a direct current tachometer system as set forth in claim 17 including a feedback circuit for applying said regulated DC output signal to said control means.

20. In a direct current tachometer system as set forth in claim 19, wherein said control means includes voltage to frequency converter means for providing a train of signal pulses having a frequency proportional to said regulated DC output signal, and phase comparing means for providing a control signal in dependence upon the phase relationship of said reference pulses and said signal pulses.

21. In a direct current tachometer system as set forth in claim 19, wherein said control means includes frequency to voltage converting means for developing a control signal having a magnitude proportional to the frequency of said reference pulses, and amplifying circuit means interposed between said converting means and said voltage regulator means and having an input circuit connected to said feedback circuit.

22. In a direct current tachometer system as set forth in claim 21 including bias voltage supply means for supplying bias voltages to all the active electronic circuits thereof, said bias voltage supply means being connected so as to supply said bias voltages only from electrical energy provided by said tachometer generator.

* * * * *